United States Patent [19]
Richards

[11] Patent Number: 5,908,277
[45] Date of Patent: Jun. 1, 1999

[54] LOCKBOLT AND METHOD FOR WIPING MATERIAL FROM A LOCKBOLT JOINT

[75] Inventor: John F. Richards, Woodinville, Wash.

[73] Assignee: The Boeing Company, Seattle, Wash.

[21] Appl. No.: 09/075,018

[22] Filed: May 8, 1998

[51] Int. Cl.$^6$ .............. F16B 13/04; F16B 19/00
[52] U.S. Cl. .............. 411/361; 411/43; 411/258; 411/930
[58] Field of Search .............. 411/34–38, 43, 411/82, 258, 361, 930

[56] References Cited

U.S. PATENT DOCUMENTS

| 3,122,050 | 2/1964 | Wenson | 411/361 |
|---|---|---|---|
| 3,139,786 | 7/1964 | Ardell | 411/361 |
| 5,265,994 | 11/1993 | Johnston et al. | 411/930 X |

FOREIGN PATENT DOCUMENTS

| 683295 | 3/1964 | Canada | 411/43 |
|---|---|---|---|

*Primary Examiner*—Neill Wilson
*Attorney, Agent, or Firm*—Lawrence W. Nelson

[57] ABSTRACT

The present invention relates to a lockbolt and a method for installing a lockbolt that removes a coating, such as a sealant that has inadvertently flowed into a hole into which the lockbolt is to be installed. The lockbolt and method prevent a coupling surface of the lockbolt from being contaminated by the coating.

8 Claims, 3 Drawing Sheets

LOCKBOLT AND METHOD FOR WIPING MATERIAL FROM A LOCKBOLT JOINT

BACKGROUND OF THE INVENTION

1. Field of the Invention

The present invention relates to a lockbolt and, more particularly, to a lockbolt that displaces unwanted material during its installation.

2. Background Information

Lockbolts are commonly used where high-strength fasteners are required, such as aircraft fuel tanks and aircraft cabins. Typically, a lockbolt collar is provided for use with a lockbolt 100, shown in FIG. 1. The collar is slid over that portion of the lockbolt which extends through overlapped plate-like members. When the collar is properly swaged to mate with the lockbolt, the resulting lockbolt joint provides a reliable, high-strength fastener for the members.

Recently, viscous material, such as a sealant, has been applied to fay-surfaces of the plate-like members to reduce the potential of any corrosion forming between the plate-like members. The sealant is typically applied at a thickness of 0.003 to 0.005 inches. When such a significant amount of sealant is used, it causes a ring of the sealant to form inside any prepared holes within the plate-like members (i.e. lap splices), especially when the members are squeezed together. When the lockbolt 100 is passed through one of the prepared holes, swaging threads 102 on the lockbolt 100, which are designed to engage the lockbolt collar, often become contaminated with the sealant. Once contaminated, the swaging threads 102 must be properly cleaned by a mechanic prior to mating the lockbolt collar to the lockbolt 100. This process is tedious and time-consuming, increasing the workload on all the mechanics that are installing the lockbolts 100. If the swaging threads 102 of the lockbolts 100 are not properly cleaned prior to swaging the collar onto the lockbolt 100, then the resulting joint is considered defective and the collar is removed by force and the lockbolt 100 and the collar replaced.

Accordingly, for the foregoing reasons, there is a need in the fastening art for an apparatus and method that eliminates the need to clean the swaging threads of a lockbolt prior to swaging a collar onto the lockbolt after the lockbolt has been inserted into a contaminated area.

SUMMARY OF THE INVENTION

In one aspect, the present invention is directed to a hole-cleaning lockbolt that removes unwanted coating flowing from inner surface of a workpiece treated with the coating into a bore within the workpiece. The lockbolt includes a shank for extending through and fitting snugly in the bore, a head adjacent to the shank for preventing movement of the lockbolt within the bore in one direction, and a plurality of annular swaging grooves adjacent to the shank on a side of the shank opposite to the head for coupling with a lock collar used to fasten the lockbolt to the workpiece. The lockbolt also includes a pintail located at an end of the lockbolt opposite to the head and designed to be removed after the swaging grooves have been coupled with the lock collar, a break pin area located between the swaging grooves and the pintail for assisting in a removal of the pintail from the lockbolt, and an O-ring positioned between the end of the lockbolt opposite to the head and the swaging groove. The O-ring has a diameter larger than a diameter of the shank such that it will wipe away the unwanted coating within the bore and preventing the unwanted coating from reaching the swaging grooves.

In another aspect, the present invention is directed to a lockbolt joint including a first workpiece having a first aperture and coated on a side with a sealant and a second workpiece having a second aperture and coated on a side with the sealant, the coated side of the second workpiece being pressed into adjacent juxtaposition with the coated side of the first workpiece such that the first aperture is aligned with the second aperture. The joint also includes a hole-cleaning lockbolt having a shank for extending through and fitting snugly in the first and second aperture, a plurality of annular grooves adjacent to the shank and projecting outwardly beyond an uncoated surface of the second workpiece, and means for cleaning sealant that flowed from the coated side of the first and second workpiece into the first and second aperture. The joint further includes a lock collar swaged about the plurality of annular grooves, the plurality of annular grooves being free from any of the sealant applied to the first and second workpiece.

In yet another aspect, the present invention is directed to a method for installing a lockbolt, having a head, a shank, a break-pin area, and a pintail, and a plurality of swaging grooves, into a hole through two workpieces containing viscous matter to prevent the viscous matter from contaminating the plurality of swaging grooves. The method includes the step of installing an O-ring around the circumference of the lockbolt at a point between the break-pin area or the pintail. The O-ring has an external diameter that exceeds the shank of the lockbolt. The method also includes the steps of coating a selected surface of each of the two workpieces with the viscous matter, pressing the selected surface of each of the two workpieces together, which causes excess amounts of the viscous matter to seep into the hole through the two workpieces, inserting the lockbolt into the hole, and scraping away most of the excess amounts of viscous matter from the hole with the O-ring, which is installed on the lockbolt.

DETAILED DESCRIPTION OF THE INVENTION

Figure 1:
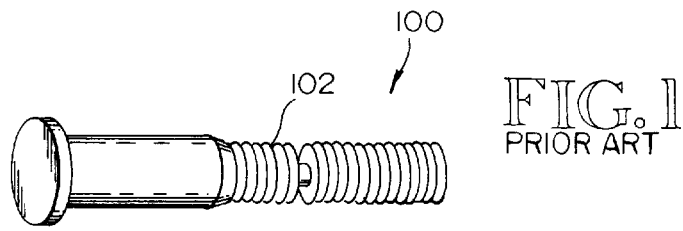
FIG. 1 shows a side view of the prior art lockbolt.

Referring to FIGS. 2A–2F, a wiper lockbolt 20 includes an O-ring 22 that removes excess material, such as sealant, within a bore 24 within first and second lap splice members 26A and 26B before the material can cover and contaminate swaging grooves 28, which are normally coupled to a swaging collar 30 during the installation of the lockbolt 20. The only contaminated portion of the lockbolt 20 is a pintail portion 32 which is broken off and easily disposed of. The O-ring 22 eliminates or significantly reduces the time required for a mechanic to clean the lockbolt 20 of the undesriable material prior to swaging the swaging collar 30 to the swaging grooves 28, thereby reducing man-hours required to perform the task of lockbolt installation.

According to a first embodiment of the present invention, as shown in FIGS. 2A–2F, the lockbolt 20 includes a head 34, a shank 36 extending from the head 34, and adjacent the swaging grooves 28. The O-ring 22 is installed on a pin-break area 38 of the bolt 20 outside of the swaging grooves 28 and inside of the pintail 32, which is at an end opposite to the head 34. An external diameter of the O-ring 22 is preferably several thousandths of an inch larger than a diameter of the shank 35, and also several thousandths of an inch larger than an inside diameter of the swaging collar 30.

The lockbolt 20 is preferably a protruding head or 100° countersink titanium lockbolt that does not use a countersink.

Figure 2A:
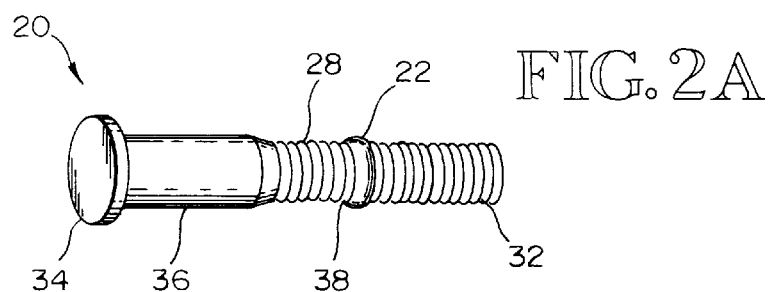
FIG. 2A shows a side view of a lockbolt with a collar wiping ring according to a first embodiment of the present invention.

The method for installing the lockbolt 20 according to the first embodiment proceeds as follows. Initially, the O-ring 22 is installed on the break-pin area 38 of the lockbolt 20, as shown in FIG. 2A. The break-pin area 38 is approximately midway along the length of the lockbolt 20. After the bore 24 has been prepared, inside surfaces of the first and second lap splice members 26A and 26B, respectively, are coated with a fay-surface sealant to a depth of 0.003 inches to 0.005 inches. The sealant is used to prevent corrosion. Then the first and second lap splice members 26A and 26B are pressed together, they extrude any excess amount of the sealant into the prepared bore 24.

Figure 2B:
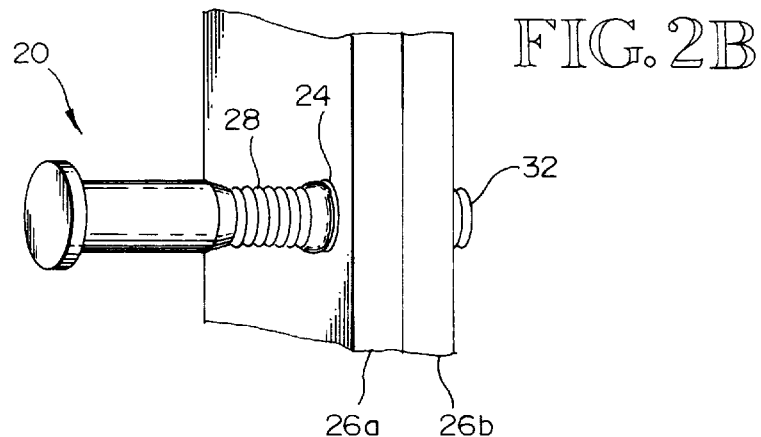
FIG. 2B shows a side view of the lockbolt with the collar wiping ring on an installation according to the first embodiment.
Figure 2C:
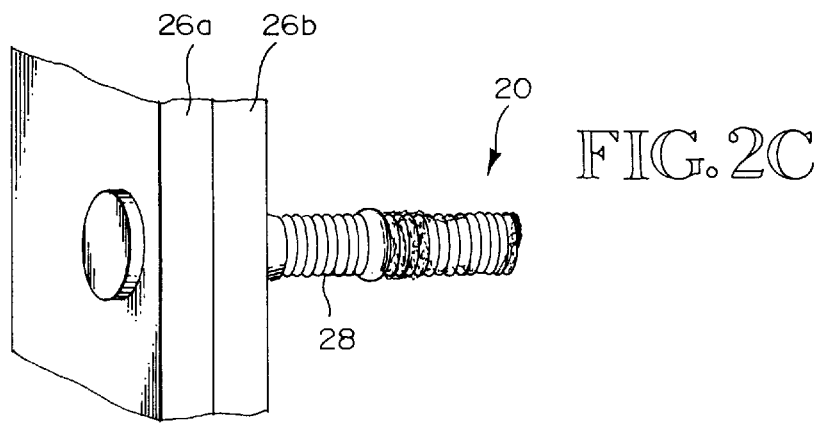
FIG. 2C shows a side view of the lockbolt installed in a bore of the installation having extruded sealant ahead of its swaging rings according to the first embodiment.

Next, as shown in FIG. 2B, the lockbolt 20 is installed into the bore 24 with the O-ring 22 positioned to enter the bore 24. As the O-ring 22 is forced through the bore 24, it wipes out most of the excess sealant therein and deposits in on the pintail portion 32 of the lockbolt 20, as shown in FIG. 2C. Once the O-ring 22 has passed through the bore 24, most, if not all, that sealant is forward of the swaging grooves 28.

Figure 2D:
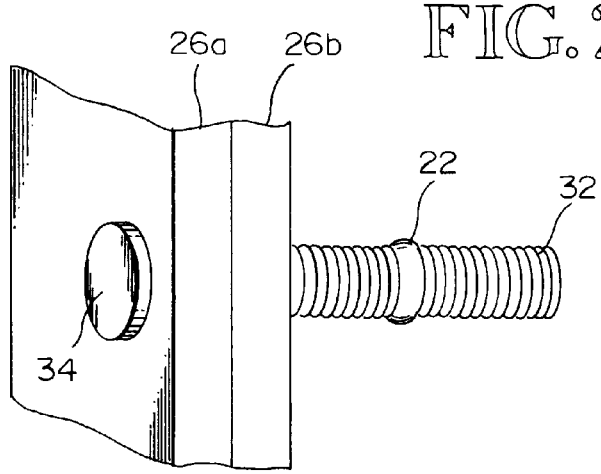
FIG. 2D shows a side view of the lockbolt with a pintail cleaned of the extruded sealant.

Next, the pintail portion 32 of the lockbolt 20 is cleaned to remove the excess sealant, as shown in FIG. 2D. Since the sealant is only on the pintail portion 32, cleanup is significantly reduced, and less solvents are consumed to perform the cleanup operation on the lockbolt 20.

Figure 2E:
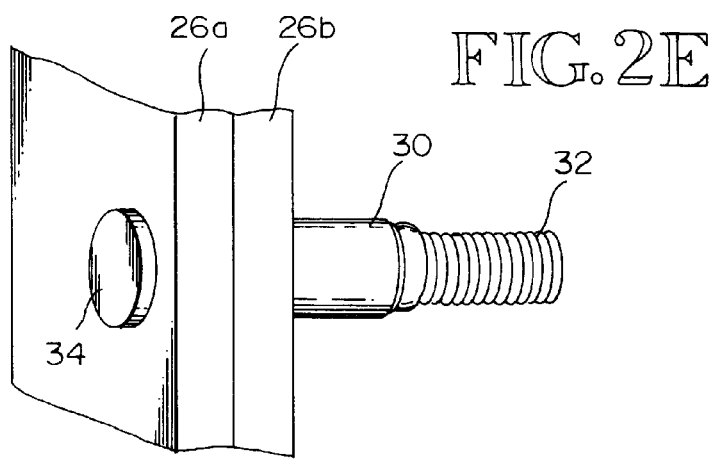
FIG. 2E shows a side view of the lockbolt with a collar installed thereon according to the first embodiment.
Figure 2F:
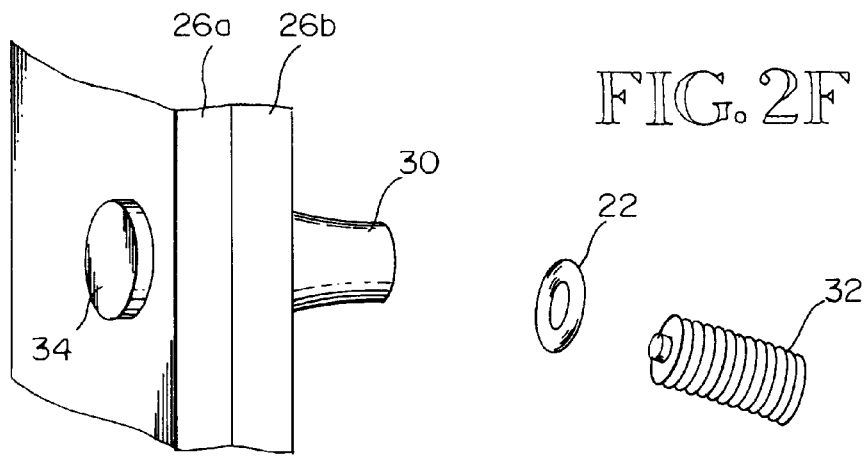
FIG. 2F shows a side view of the lockbolt and the collar with the pintail broke and the swaging complete according to the first embodiment.

Next, the swaging collar 30 is slid onto the lockbolt 20 so it is snug against the second lap-splice member 26B, as shown in FIG. 2E. Even if the pintail portion 32 was not cleaned in the previous step, the O-ring 22 would wipe any sealant from the inner surface of the swaging collar 30 that might have inadvertently been picked up from the pintail portion 32. The swaging collar 30 is then swaged onto the swaging portion 28 of the lockbolt 20, as is known in the art, and described in U.S. Pat. No. 4,768,910, incorporated herein by reference. When the swaging is complete, the pintail portion 32 is broken off using a sharp force that disturbs the O-ring 22 situated in the finished collar 30, as shown in FIG. 2F.

As discussed above, the O-ring 22 is stretched over the break pin area 38 of the lockbolt 20. Because the break-pin area 38 reduces in diameter after the swaging process, the O-ring 22 has a tendency to fall off when the pintail portion 32 is broken off. If the O-ring 22 remains adjacent to the finished collar 30, then it can be easily identified and removed. The O-ring 22 is easily identified because it is black, while the lockbolt 20 tends to have a silver coloring.

Figure 3A:
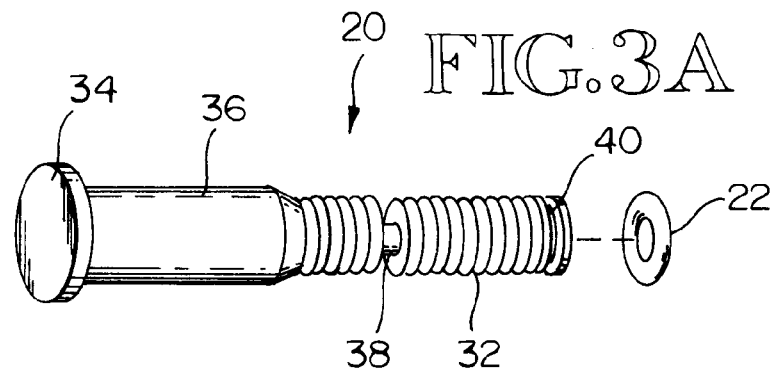
FIG. 3A shows a side view of a lockbolt with an additional groove according to a second embodiment to the present invention.
Figure 3B:
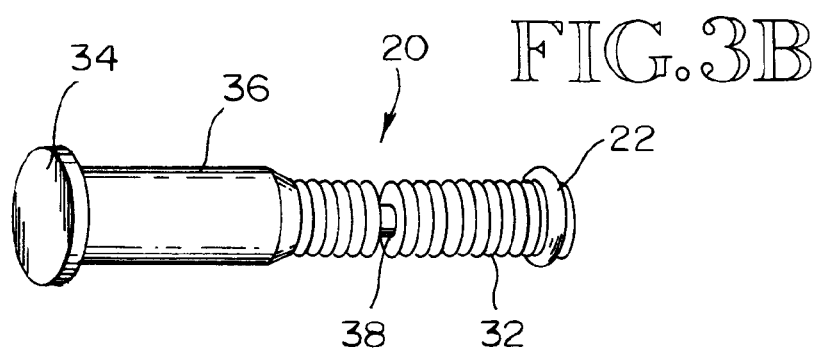
FIG. 3B shows a side view of the lockbolt with a wiping ring installed in the additional groove according to the second embodiment.
Figure 3C:
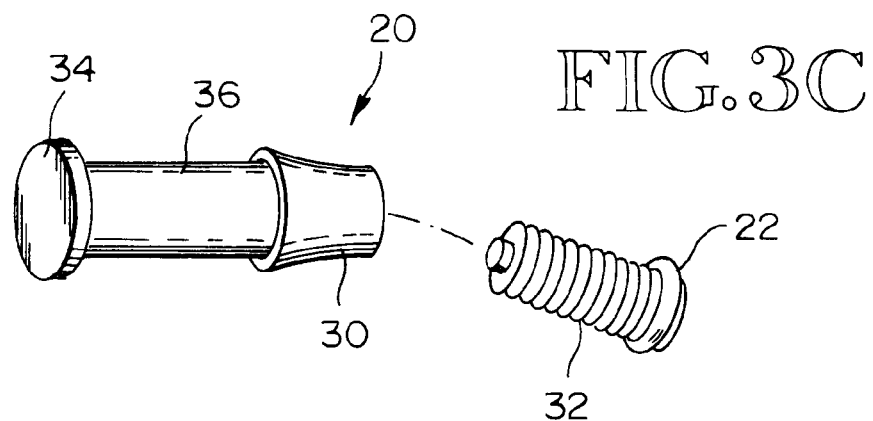
FIG. 3C shows a side view of the lockbolt with a collar swaged thereon and a pintail extracted after installation having the wiper ring according to the second embodiment.

In a second embodiment, the lockbolt 20 is modified, as shown in FIG. 3A, to include a wiper groove 40. The wiper groove 40 is preferably positioned on the pintail portion 32 of the lockbolt 20. Even more preferable is to position the wiper groove 40 on to a point between $12/16$ to $15/16$ of the length of the pintail portion 32, away from the broken pin area 38. The wiper groove 40 is sized to accommodate the O-ring 22, as shown in FIG. 3B. The positioning of O-ring 22 at the far end of the pintail portion 32 of the lockbolt 20 effectively eliminates cleanup of expended O-rings 22 after the swaging collars 30 are swaged and the pintail portion 32 is broken off, as shown in FIG. 3C. This provides significant benefit, in that an accumulation of the used unrecovered O-rings 22 could inadvertently block critical systems being worked. Further, the position of the wiper groove 40 guarantees that the fracture at the designated brake pin area 38 will not be affected by the O-ring 22.

The present invention provides the unique advantage of a fastener that cleans out excess material in a bore quickly and simply while it is being positioned, thereby reducing the number of man hours required to install a lockbolt assembly.

While the detailed description above has been expressed in terms of specific examples, those skilled in the art will appreciate that many other configurations could be used to accomplish the purpose of the disclosed inventive apparatus. Accordingly, it will be appreciated that various equivalent modifications of the above-described embodiments may be made without departing from the spirit and scope of the invention. Therefore, the invention is to be limited only by the following claims.

I claim:

1. A hole-cleaning lockbolt that removes unwanted coating flowing from an inner surface of a workpiece treated with the coating into a bore or countersink within the workpiece, said lockbolt including:

a shank for extending through and fitting snugly in the bore;

a head adjacent to said shank for preventing movement of the lockbolt in one direction within the bore;

a plurality of annular swaging grooves adjacent to said shank, on a side of said shank opposite to said head, that couple with a lock collar used to fasten the lockbolt to the workpiece;

a pintail located at an end of the lockbolt opposite to said head and designed to be removed after said swaging grooves have been coupled to the lock collar;

a break pin area located between said swaging grooves and said pintail where said pintail disengages from the lockbolt; and an O-ring positioned between the end of the lockbolt opposite to said head and said swaging groove, said O-ring having an external diameter larger than a diameter of said shank such that it will wipe away the unwanted coating within the bore and preventing the unwanted coating from reaching said swaging grooves.

2. The lockbolt according to claim 1 wherein said O-ring is positioned around said break pin area.

3. The lockbolt according to claim 1 wherein the external diameter of said O-ring is larger in diameter than an internal diameter of the lock collar.

4. The lockbolt according to claim 1 wherein said O-ring is at least three thousandth of an inch greater in diameter than a diameter of said shank.

5. The lockbolt according to claim 1 wherein said pintail further comprises a wiper groove formed therein and sized to accommodate an internal circumference of said O-ring which is positioned thereon.

6. The lockbolt according to claim 5 wherein said wiper groove is positioned at a point between $^{12}/_{16}$ to $^{15}/_{16}$ of a length of said pintail away from said break pin area.

7. A method for installing a lockbolt, having a head, a shank, a break pin area, and a pintail, and a plurality of swaging grooves, into a hole through two workpieces containing viscous matter to prevent the viscous matter from contaminating the plurality of swaging grooves, said method including the steps of:

installing an O-ring around the circumference of the lockbolt at a point between the break pin area and a forward-most part of the pintail, the O-ring having an external diameter that exceeds the shank of the lockbolt;

coating a selected surface of each of the two workpieces with the viscous matter;

pressing the selected surface of each of the two workpieces together, which causes excess amounts of the viscous matter to seep into the hole through the two workpieces;

inserting the lockbolt into the hole; and scraping away most of the excess amounts of viscous matter from the hole with the O-ring, which is installed on the lockbolt.

8. The method according to claim 7, further including the steps of cleaning the viscous matter from the pintail of the lockbolt;

sliding a lock collar onto the lockbolt so that it is positioned over the plurality of swaging grooves; and swaging the lock collar to the swaging grooves of the lockbolt.

* * * * *